T. SHAW.
Noise-Quieting Steam-Nozzle.
No. 8,643. Reissued April 1, 1879.
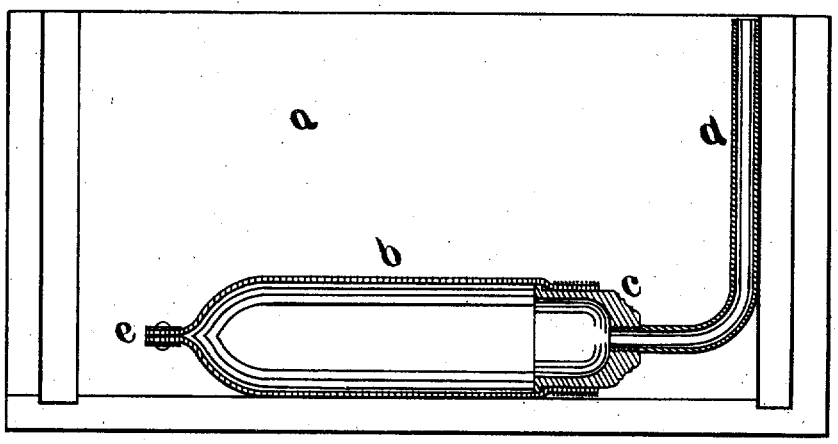
WITNESSES:
Elias J. Shaw
Chas E. Larkin
Thomas Shaw INVENTOR
ATTORNEY
N. PETERS, PHOTO-LITHOGRAPHER, WASHINGTON, D. C.

UNITED STATES PATENT OFFICE.

THOMAS SHAW, OF PHILADELPHIA, PENNSYLVANIA.

IMPROVEMENT IN NOISE-QUIETING STEAM-NOZZLES.

Specification forming part of Letters Patent No. 90,127, dated May 18, 1869; Reissue No. 8,643, dated April 1, 1879; application filed April 10, 1877.

*To all whom it may concern:*

Be it known that I, THOMAS SHAW, of the city and county of Philadelphia, Pennsylvania, have invented a new and Improved Noise-Quieting Nozzle; and I hereby declare the following to be a full, clear, and exact description of the same, reference being had to the accompanying drawing, and to the letters of reference marked thereon.

My invention consists in the provision of a material provided with numerous apertures, more or less fine, for the purpose of subdividing the steam into numerous fine streams, whereby the noisy vibrations are caused to be absorbed upon the extended surface of the numerous outlets provided for the escaping steam.

The object of the invention is to suppress the noise of high-pressure escaping steam.

In order to enable others to use and practice my invention, I will proceed to describe its construction and operation.

On reference to the accompanying drawing, which forms part of this specification, the sketch represents the device as applied to one of its uses, and is shown in position in a vat.

The sketch shows a longitudinal vertical section through the center of the apparatus, of which *a* is an ordinary wood tank, into which descends a steam-pipe, *d*, leading from any source of steam-pressure. Said pipe *d* is provided with a metal socket, *c*, on the outside of which is secured, by wire, a canvas tube, *b*, the other end of which is riveted shut at *e*, all for the purpose hereinafter described.

The operation is in this wise: Steam is allowed to flow from any source of pressure into canvas tube *b*, from whence it percolates or blows through the numerous meshes or apertures of the canvas, which sifts it of all sound, by reason of the vibrations being absorbed upon the extended surface of the many passage-ways thus provided, the result of which is a blowing off of steam without noise.

Without limiting myself to any special material for or shape of the hose or tube,

I claim—

1. The noiseless steam-nozzle *b*, arranged at the outer end of an escape-steam pipe, *d*, for the purpose of suppressing the noise of escaping steam, as set forth.

2. A device for subduing the noise of escaping steam, adapted for application to the outer end of a steam-pipe, and having numerous small outlets through which the steam must pass in escaping, substantially as set forth.

3. A device for subduing the noise of steam escaping from a pipe outside of a boiler, consisting of a wall of finely-perforated material, for the purpose of arresting the vibrations of the escaping steam, substantially as specified.

THOMAS SHAW.

Witnesses:

ELIAS J. SHAW,

WM. HART CARR.